United States Patent [19]

Sekmakas et al.

[11] Patent Number: 4,525,543

[45] Date of Patent: Jun. 25, 1985

[54] EPOXY-FREE HYDROXY FUNCTIONAL POLYETHER BASED ON OLEYL ALCOHOL AND SOLVENT-SOLUBLE COPOLYMERS CONTAINING THE SAME

[75] Inventors: Kazys Sekmakas, Palatine; Edward J. Murphy, Mount Prospect, both of Ill.

[73] Assignee: DeSoto, Inc., Des Plaines, Ill.

[21] Appl. No.: 24,052

[22] Filed: Mar. 26, 1979

Related U.S. Application Data

[63] Continuation-in-part of Ser. No. 935,505, Aug. 21, 1978, abandoned, which is a continuation of Ser. No. 548,680, Feb. 10, 1975, abandoned.

[51] Int. Cl.³ .................. C08G 59/14; C08L 63/02
[52] U.S. Cl. .................................. 525/529; 523/402; 524/901; 525/481; 525/510
[58] Field of Search ............... 260/836, 837 R; 528/110, 393; 525/529, 118; 526/317

[56] References Cited

U.S. PATENT DOCUMENTS

| | | | |
|---|---|---|---|
| 2,700,030 | 1/1955 | Widmer et al. | 525/529 |
| 3,375,227 | 3/1968 | Hicks | 260/47 EP |
| 3,516,913 | 6/1970 | Sekmakas et al. | 204/181 |
| 3,670,047 | 6/1972 | Broecker | 260/837 R |
| 3,865,771 | 2/1975 | Sekmakas | 260/29.3 |
| 3,976,615 | 8/1976 | Sekmakas | 260/47 EP |

*Primary Examiner*—Theodore E. Pertilla
*Attorney, Agent, or Firm*—Dressler, Goldsmith, Shore, Sutker & Milnamow, Ltd.

[57] ABSTRACT

Epoxy-free hydroxy functional polyethers are provided which are the reaction product of a diglycidyl ether of a bisphenol having a molecular weight of about 1000 with a stoichiometric proportion of oleyl alcohol. These oleyl alcohol-based polyethers can be copolymerized in organic solvent solution with monoethylenically unsaturated monomers to form solvent-soluble copolymers. When the monomers include carboxyl-functional monomers providing an acid number in the range of 12–60, the copolymers are particularly adapted to be dispersed in water with the aid of a base and then electrodeposited at the anode together with a heat-hardening formaldehyde condensate to form corrosion resistant coatings.

3 Claims, No Drawings

EPOXY-FREE HYDROXY FUNCTIONAL POLYETHER BASED ON OLEYL ALCOHOL AND SOLVENT-SOLUBLE COPOLYMERS CONTAINING THE SAME

This application is a continuation-in-part of our prior application Ser. No. 935,505, filed Aug. 21, 1978, which, in turn, is a continuation of our application Ser. No. 548,680, filed Feb. 10, 1975. Both of these applications are now abandoned.

The present invention relates to anodic electrocoating from an aqueous bath to provide cured coatings possessing superior corrosion resistance. The invention includes certain oleyl alcohol-based polyethers and solvent-soluble copolymers containing the same.

The electrodeposition of polyanionic resins from an aqueous medium containing the same is well known. However, the electrodeposited coatings have lacked desired corrosion resistance, and adequate dispersibility in water has required that the electrocoating bath be excessively alkaline and unduly conductive. Also, phenolic resins have previously been required to maximize corrosion resistance, and it is preferred to eliminate this component since it allows one to employ lower curing temperatures.

In accordance with this invention, a diglycidyl ether of a bisphenol having a molecular weight of about 1000 is reacted with a stoichiometric proportion of oleyl alcohol, which is an ethylenically unsaturated alcohol characterized by having a single internally positioned double bond, to consume the epoxy functionality in the production of an ethylenically unsaturated hydroxy functional polyether containing about 2.0 ethylenically unsaturated ether groups per molecule. This polyether, with its hydroxy groups substantially unreacted, is then copolymerized in organic solvent solution with monoethylenically unsaturated monomers. For anodic electrocoating the monomers should include carboxyfunctional monomer to provide an acid number in the range of 12-60. When more carboxy monomer is used, the resulting acidic copolymer is adducted with a monoepoxide in stoichiometric deficiency with respect to carboxyl to provide the desired final acidity. This acidic copolymer is solubilized with the aid of a base, typically an amine, and then dissolved or dispersed in water together with a formaldehyde condensate, preferably comprising an aminoplast resin, and a unidirectional electrical current is passed through the bath so-provided, which normally has a resin solids content of from 2%-20% by weight, to cause the deposit of a coating at the anode.

In conventional industrial anodic electrocoating practice, the acidic polymers which are dispersed in the electrocoating bath have an acid number of at least 75, and the bath has a conductivity in the range of 1500-1800 micromhos per cm. In this invention, the preferred resins have an acid number of less than 60, desirably about 40-50, and the bath has a conductivity of less than 1350, desirably 800-1200 micromhos per cm. Also, the conventional electrocoating bath has a pH of 9.5-10 whereas, in this invention, a pH of less than 9.25 is desired, preferably pH 8.5-9.0.

As a result of these changes in the resin and the electrocoating bath, the bath is more stable and less reactive to carbon dioxide. This reduces carbon dioxide absorption and lowers polymer hydrolysis. These factors relating to the bath in combination with the reduced acidity in the polymers which are electrodeposited contribute to the production of coatings which exhibit superior corrosion resistance.

We start with a polyepoxide which is a diglycidyl ether of a bisphenol having a molecular weight of about 1000. These polyepoxides have a 1,2-epoxy equivalency of about 2.0 when subjected to etherification, and etherification with a stoichiometric proportion of oleyl alcohol is complete to remove residual epoxy functionality which is undesirable.

The term "bisphenol" denotes a pair of phenolic groups separated by an intervening divalent alkylene group. The commercial materials are derivatives of bisphenol "A".

From the standpoint of the commercially available materials, the Shell product Epon 1001 is used, this material having an average molecular weight of 1000, a melting point of 67° C.-74° C., an epoxy value of 0.20 equivalent per 100 grams, and an hydroxyl value of 0.32 equivalent per 100 grams. Other commercial epoxy resins of known characteristics are also available. Epon 828 is chemically the same as Epon 1001, but has a lower average molecular weight. Epon 1004 is also chemically the same as Epon 1001, but has a higher average molecular weight.

The lower and higher counterparts of the epoxy resin used herein have been substituted for the Epon 1001 in Example 1 herein in an amount to use the same equivalent proportion of epoxy functionality, but the results are not comparable. With Epon 1004, the product was a nonflowing hazy solid instead of a clear solution. With Epon 828, the Gardner-Holdt viscosity was only G-H instead of Z5-Z6. Copolymers similar to those in Example 2 were then made, dispersed in water with dimethyl ethanol amine, and electrodeposited as in Example 3. The dispersion made from the copolymer containing the higher molecular weight epoxy resin was poorly stable and tended to form seeds and to settle, and the electrodeposited film was thin and the cured coatings were porous and rusted quickly in salt spray. The dispersion made from the copolymer containing the lower molecular weight epoxy resin deposited a thicker film, but the wet film had little integrity and could not be washed, and when baked it became thermoplastic and flowed to form a ridge at the bottom of a vertical panel.

Oleyl alcohol has an unusual structure, namely, a single internally positioned double bond. When large amounts of monoethylenic monomers are to be copolymerized with a diether, it is clear that the restricted capacity for copolymerization provided by oleyl alcohol helps to provide a uniform solvent-soluble copolymer product which is important to enable stable dispersion in water without excessive alkalinity. Unsaturated alcohols are difficult to obtain, so other alcohols have not been available for comparative test. Nonetheless, the unsaturation possessed by oleyl alcohol is uniquely different from that provided by most unsaturated fatty materials.

The etherification reaction is itself conventional, the reactants being cooked together at moderate temperature (75° C.-175° C.). An organic solvent may be present, especially to assist incorporation of anetherification catalyst, illustrated herein by boron trifluoride etherate. Inert water-miscible solvents, such as methyl ethyl ketone, are preferred, since these are nonreactive with the polyepoxied and the alcohol, and they facilitate dissolution in water, which is the ultimate goal of the polymer.

While the etherification reaction is itself a conventional one, it is desired to substantially fully consume the epoxy functionality in the epoxide. This means use of an approximately stoichiometric proportion of unsaturated alcohol (1 equivalent of hydroxy per equivalent of epoxide) and substantially complete reaction (at least about 90%).

The etherification reaction thus produces a polyethylenically unsaturated hydroxy-functional polyether.

Since there is more than one ethylenically unsaturated group, this means that the original polyepoxide is now subject to polymer growth at more than one location. In preferred practice, we start with a diepoxide, and copolymer formation occurs at both ends of the molecule, and it is this aspect of the situation which enables physical and chemical resistance to be maximized without requiring undue alkalinity for the dissolution of the copolymer in water.

The unsaturated hydroxy functional polyether is then copolymerized, preferably in organic solvent solution, with monoethylenically unsaturated monomers including a proportion of carboxy-functional monomer to produce a carboxylic acid copolymer solution. The solution copolymerization is itself conventional, the organic solvent being selected to be water miscible to ease the subsequent solubilization in water with the aid of an acid. Any water miscible organic solvent may be utilized, such as methyl ethyl ketone, or 2-ethoxy ethanol, and the like.

The unsaturated hydroxy functional polyether should constitute from 5%–75% of the copolymer, preferably from 20%–60%. The balance of the copolymer should consist essentially of copolymerizable monoethylenically unsaturated monomers, a portion of which is carboxy-functional.

Considering the balance of the copolymer which consists essentially of monoethylenic monomers, and directing attention first to the monomers which are not carboxy-functional, these may be reactive or nonreactive, but the nonreactive monomers are preferred to constitute from about 50% up to about 85% of the monoethylenic monomers. Particularly preferred are styrene or vinyl toluene, or a mixture thereof. Monoethylenic carboxylic acid esters and diesters are also useful, such as butyl methacrylate, ethyl acrylate, dibutyl maleate, etc., but these are less preferred.

The class of monoethylenically unsaturated carboxylic acids is itself well known, acrylic acid being preferred and used as illustrative. Other useful carboxylic acids are illustrated by methacrylic acid, crotonic acid, itaconic acid, fumaric acid, monobutyl maleate, etc. The monocarboxylic acids are preferred.

These acids are used in an amount to provide the desired final acidity. Larger amounts of acid may be used, but then the excess acid should be removed, as by reaction with monoepoxide.

Other water soluble reactive monoethylenic monomers may also be present, such as acrylamide, N-methylol acrylamide, or hydroxy ethyl acrylate, and this helps the ultimate cure, though the presence of such other reactive monomers is not needed herein.

As previously indicated, the carboxylic acid copolymer containing excess acidity is reacted with a stoichiometric deficiency of a monoepoxide which may be any monoepoxide as pointed out in U.S. Pat. No. 3,516,913, but in preferred practice, we select a long straight chain monoepoxide containing at least 12 carbon atoms, as disclosed in U.S. Pat. No. 3,865,771. The long straight chain provided by the monoepoxide would normally not contain in excess of about 30 carbon atoms, and would preferably contain from 14–22 carbon atoms. The invention will be illustrated by a mixture of olefin epoxides which contain from 14–16 carbon atoms.

The single epoxide group is provided in terminal position, conveniently by the peroxidation of a straight chain hydrocarbon containing a single ethylenic group in terminal position. The peroxidation is easily carried out by reaction with peracetic acid so as to provide a 1,2-monoepoxide. As will be appreciated, when this 1,2-monoepoxide is reacted with the carboxyl groups on the copolymer, an hydroxy ester is formed with the hydroxy group being in the 2 position and with the straight hydrocarbon chain remainder of the monoepoxide providing a terminal group extending from the adduct.

The hydroxy functional acidic resins of the invention should have an acid number of from about 12 to about 60, preferably from about 40 to about 50. It is surprising to find adequate water solubility for such a complex copolymer at such low acidity.

The capacity to disperse the hydroxy functional acidic resins in water utilizing salt formation with a base, normally a nitrogenous base such as an amine, is aided by the presence of water miscible organic solvent. It will be appreciated that the choice of the base used for salt formation as well as the utilization and selection of water miscible organic solvents are common knowledge in the electrocoating art. The conventional amines, such as triethyl amine or triethanol amine may be used, or weaker bases than are usual can also be accommodated. Water miscible organic solvents are illustrated by methyl ethyl ketone, lower alcohols such as isopropyl alcohol, ether alcohols such as 2-ethoxy ethanol or 2-butoxy ethanol, and the like. They normally constitute at least 12% of the weight of resins dispersed in the water phase, but preferably not more than 50% on the same basis.

It is desired to point out that the increased water solubility which is provided at low acid number leads to aqueous electrocoating baths of lower than usual pH. Thus, and while it is broadly known that the bath pH can vary from 6–11, practical commercial operation has required a pH of 9.5–10 and a conductivity of 1500–1800 micromhos per cm. As previously indicated, the bath in this invention has a pH of less than 9.25, e.g., 8–9.25, preferably pH 8.5–9.0, and a conductivity of less than 1350, e.g., 600–1350, preferably 800–1200.

It should also be observed that the resin which is electrodeposited herein has an epoxy resin backbone with copolymeric growth at more than one end thereof. The capacity to operate at low pH with a resin of such intrinsic strength and complexity leads to improved corrosion resistance, and one is no longer dependent on phenolic resin additions which increase curing temperature.

While the hydroxy functional polyethers used herein can be partially esterified, this is not desirable since it decreases hydrolytic stability in the alkaline electrocoating bath, and it reduces solubility which makes it necessary to increase bath pH and alkalinity.

It is desired that the aqueous coating compositions of this invention be thermosetting and the thermosetting cure is provided by the presence in the water medium of the coating of dispersed heat-hardening formaldehyde condensate.

The aqueous coating composition containing the dispersed hydroxy functional acidic resin thus has incorporated therein from 5%–40%, preferably 10%–30%, based on the total weight of resin, of a heat-hardening formaldehyde condensate, which can be dispersed in the aqueous medium. The class of heat-hardening formaldehyde condensates is a well known class including aminoplast resins and phenolic resins. Typical aminoplast resins, all of which are formaldehyde condensates, are urea-formaldehyde, hexamethoxy methyl melamine and water dispersible transethers thereof with ethanol or other lower alcohol, benzoguanamine-formaldehyde and the like, including acidic derivatives where the carboxyl group assists solubilization in aqueous alkaline medium. This class of heat-hardening formaldehyde condensates also includes water soluble or dispersible phenolic resins, these being illustrated by the well known nongelled alkaline condensates of phenol with excess formaldehyde known as "A" stage resols. Any of these formaldehyde condensates can be used alone or in any desired mixture thereof. The phenolic resins provide the most outstanding corrosion and detergent resistance and are normally needed to meet commercial standards, but this is importantly not true herein where the phenolic resins may be omitted while still provided excellent corrosion and detergent resistance.

The aqueous electrocoating baths of this invention are formulated to contain 2–20%, preferably 5–15% of resin solids.

While electrocoat utility is of primary concern herein, the water solutions of this invention can be more concentrated, e.g., containing 25% or more of resin solids. Since the resins of this invention cure to provide good film properties and are highly soluble in aqueous medium at lower pH, they function well as aqueous coatings, being particularly useful for appliance coatings.

The films deposited on the anode in accordance with the invention are baked to cure the same, appropriate baking conditions being from 200°–600° F. for periods varying from about 20 seconds at the highest temperatures to about 1 hour at the lowest temperatures. Normally, a baking temperature of at least about 300° F. is used.

The invention will be illustrated in the examples which follow, it being understood that all parts and proportions presented herein are by weight unless otherwise specified.

EXAMPLE 1

Preparation of Epoxy Ether Intermediate

| Parts by Weight | Component |
| --- | --- |
| 1500 | Epoxy resin (see Note 1) |
| 500 | Methyl ethyl ketone |
| 810 | Fatty alcohol (see Note 2) |
|  | Charge the above into reactor, set reflux condenser, and heat to 90° C. |
| 1.2 | Boron trifloroetherate |
| 90 | Fatty alcohol (see Note 2) |

Note 1 - The epoxy resin is a diglycidyl ether of bisphenol A having an average molecular weight of 1000 and an epoxide equivalent weight of 500. The commercial material Epon 1001 (Shell) can be used.
Note 2 - The fatty alcohol is oleyl alcohol having an equivalent weight of 300 provided in the commercial product ADOL 32 (Ashland Oil, Inc.) having an iodine value of 75–85 and an hydroxyl value of 205–225.

Premix the catalyst and fatty alcohol and add catalyst solution to reactor over a 45 minute period. Set Dean-Stark trap. Increase temperature to 120° C. and hold for 2 hours. Distill off methyl ethyl ketone and collect in Dean-Stark trap, until 140° C. is reached and all methyl ethyl ketone is distilled off. Start cooling and add 600 parts by weight of 2-butoxy ethanol to provide a product containing 79.3% solids, having a Gardner-Holdt viscosity of $Z_6$-$Z_7$ and a Gardner color of 2.

EXAMPLE 2

Preparation of Epoxy Olefin Resin

| Parts by Weight | Component |
| --- | --- |
| 250 | 2-butoxy ethanol |
| 425 | Epoxy Ether Intermediate of Example 1 |
|  | Charge the above into reactor, heat to 140° C. and set reflux condenser. |
| 550 | Styrene |
| 290 | Acrylic acid |
| 40 | Cumene hydroperoxide |
|  | Add the above over a 3½ hour period while maintaining temperature at 140° C. When addition is completed, hold for one hour. |
| 6 | Cumene hydroperoxide - add and hold 1 hour. |
| 6 | Cumene hydroperoxide - add and hold 1 hour. |
| 6 | Cumene hydroperoxide - add and hold 1 hour. |
| 5 | Diisopropanol amine - add |
| 10 | 2-butoxy ethanol - add |
| 550 | Olefin Epoxide 14–16 (see note 3) - add over a 30 minute period. Hold for a constant acid value (40–43). Cool and add 420 parts of isopropanol and 250 parts 2-butoxy ethanol to provide a product having a solids content of 62.7%, a Gardner-Holdt viscosity of $Z_3$-$Z_4$, and a Gardner color of 3–4. The acid value, on solids, was 42.4. |

Note 3 - A mixture of $C_{14}$ and $C_{16}$ 1,2-monoepoxides. The total 1,2-monoepoxide content is 90.79%, 66.52% being $C_{14}$ monoepoxide and 24.27% being $C_{16}$ monoepoxide. The oxirane oxygen content is 6.8%, the iodine number is 2.2, and the acidity is 0.31% as acetic acid.

EXAMPLE 3

Electrocoat System Based on Example 2 Epoxy Olefin Resin

|  | Total Weight | Nonvolatile |
| --- | --- | --- |
| Epoxy Olefin Resin of Ex. 2 | 100.2 | 61.6 |
| Benzoguanamine-Formaldehyde resin (CLA 1123 - American Cyanamid) | 15.7 | 15.4 |
| Diethyl ethanol amine | 8.6 |  |
| TiO$_2$ Anatase (chloride process) pigment | 23.0 | 23.0 |
| Deionized water | 852.5 |  |
|  | 1000.00 | 100.0 |

The pigment is ground into the epoxy olefin resin, the benzoguanamine resin is added, the amine is then added, and the mixture is then let down with water.

Bath pH = 8.8
Conductivity = 1100 micromhos per cm.
Solids content = 10% (76% is resin)
Resin solids content = 7.6%
Deposition parameters: voltage for 1.0 mil 120 v ± 50 v
Cure schedule: 20 minutes at 400° F.
Detergent resistance over EP2 zinc phosphated cold rolled steel: pass 100 hours (1½% synthetic detergent per ASTM)
Salt spray resistance over EP2 zinc phosphated cold rolled steel: pass 500 hours with ⅛" scribe creep.

The invention is defined in the claims which follow.

We claim:

1. An organic solvent-soluble copolymer of 20%–60% by weight of an epoxy-free hydroxy functional polyether reaction product of a diglycidyl ether of a bisphenol having a molecular weight of about 1000 with a stoichiometric proportion of oleyl alcohol, based on the oxirane functionality of said diglycidyl ether, with monoethylenically unsaturated monomers copolymerizable therewith, said monomers including carboxyl functional monomer providing the copolymer with an acid number in the range of 12–60, said copolymer being formed by copolymerization in organic solvent solution.

2. An organic solvent-soluble copolymer as recited in claim 1 in which a major proportion of said monomers is constituted by styrene or vinyl toluene.

3. An organic solvent-soluble copolymer as recited in claim 1 in which said bisphenol is bisphenol A.

* * * * *